United States Patent
Gresch et al.

(10) Patent No.: US 10,448,556 B2
(45) Date of Patent: Oct. 22, 2019

(54) ARRANGEMENT AND METHOD FOR MONITORING AND/OR CONTROLLING THE DRIVING STATE OF A SELF-PROPELLED AGRICULTURAL WORKING MACHINE

(71) Applicant: Deere & Company, Moline, IL (US)

(72) Inventors: Valentin Gresch, Kaiserslautern (DE); Martin Kremmer, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 123 days.

(21) Appl. No.: 15/586,053

(22) Filed: May 3, 2017

(65) Prior Publication Data

US 2017/0339822 A1 Nov. 30, 2017

(30) Foreign Application Priority Data

May 30, 2016 (DE) .................. 10 2016 209 270

(51) Int. Cl.
| | |
|---|---|
| *A01B 69/04* | (2006.01) |
| *B62D 6/00* | (2006.01) |
| *B60W 40/13* | (2012.01) |
| *B62D 49/02* | (2006.01) |
| *B60D 1/30* | (2006.01) |

(Continued)

(52) U.S. Cl.
CPC ............ *A01B 69/008* (2013.01); *B62D 6/002* (2013.01); *A01B 79/005* (2013.01); *B60D 1/141* (2013.01); *B60D 1/30* (2013.01); *B60W 40/13* (2013.01); *B60W 2040/1315* (2013.01); *B62D 49/02* (2013.01); *B62D 49/08* (2013.01); *Y02P 60/142* (2015.11)

(58) Field of Classification Search
CPC .......... B62D 49/08; B60D 1/141; B60D 1/30; B60D 1/305; B60W 2040/1315
See application file for complete search history.

(56) References Cited

U.S. PATENT DOCUMENTS

| | | | |
|---|---|---|---|
| 8,694,207 B2 * | 4/2014 | Stuetzler | B60W 40/12 701/38 |
| 9,309,099 B2 * | 4/2016 | Dal Dosso | B66F 9/183 |

(Continued)

FOREIGN PATENT DOCUMENTS

| | | |
|---|---|---|
| DE | 1035501 A1 | 5/1992 |
| DE | 10230474 A1 | 1/2004 |

(Continued)

OTHER PUBLICATIONS

European Search Report issued in counterpart application No. 17170198.0 dated Oct. 24, 2017. (6 pages).

*Primary Examiner* — Todd M Melton

(57) ABSTRACT

An arrangement for monitoring and or controlling the driving state of a self-propelled agricultural working machine comprising a variable-position interface for attaching an implement that is provided with a control device. Vehicle-specific data, a position signal regarding the position of the interface, and implement data regarding physical properties of an implement mounted on the interface can be supplied to the control device. The control device is operated to evaluate at least one the driving state of the working machine, taking into consideration the above-mentioned signals and data to control the working machine.

18 Claims, 2 Drawing Sheets

(51) Int. Cl.
    *B60D 1/14*     (2006.01)
    *B62D 49/08*     (2006.01)
    *A01B 79/00*     (2006.01)

(56) References Cited

U.S. PATENT DOCUMENTS

| | | |
|---|---|---|
| 2006/0142936 A1 | 6/2006 | Dix |
| 2010/0198491 A1* | 8/2010 | Mays ............... B60W 30/09 701/124 |
| 2010/0204891 A1* | 8/2010 | Biggerstaff ........ E02F 3/3414 701/50 |
| 2014/0284118 A1* | 9/2014 | Van Mill ............ B65G 43/00 177/1 |

FOREIGN PATENT DOCUMENTS

| | | |
|---|---|---|
| DE | 10250694 B3 | 2/2004 |
| DE | 102007032310 A1 | 1/2009 |
| DE | 202011100844 U1 | 8/2011 |
| DE | 202011100493 U1 | 4/2012 |
| DE | 102011012407 A1 | 8/2012 |
| DE | 102012109210 A1 | 4/2014 |
| DE | 102013013243 A1 | 2/2015 |
| DE | 102013109444 A1 | 3/2015 |
| EP | 2042276 A2 | 4/2009 |
| EP | 2524586 A2 | 11/2012 |

\* cited by examiner

ARRANGEMENT AND METHOD FOR MONITORING AND/OR CONTROLLING THE DRIVING STATE OF A SELF-PROPELLED AGRICULTURAL WORKING MACHINE

RELATED APPLICATIONS

This document claims priority based on German Patent Application No. 102016209270.7, filed May 30, 2016, which is hereby incorporated by reference into this document.

FIELD OF INVENTION

The invention relates to an arrangement and method for monitoring and/or controlling the driving state of a self-propelled agricultural working machine and to a working machine equipped with such an arrangement.

BACKGROUND ART

Self-propelled tractors are used for a variety of purposes in agriculture, for example cultivation, for spreading material such as seed or fertilizer on the field, for harvesting or for transport work. Accordingly, different implements, such as plows, seeders, fertilizer spreaders, balers, mowers, attached forage harvesters or transport trailers, must be coupled to the tractor. The tractors are therefore equipped with one or more interfaces at which different implements can be attached. Such interfaces can comprise a trailer hitch for towing a transport trailer or baler for example, a rear power lift (generally a three point hitch) at the rear end of the tractor and/or a front power lift (generally a three point hitch) at the front end of the tractor, each of which can be used for attaching implements not coupled by a tow bar, such as mowers, field sprayers, forage harvesters, fertilizer spreaders, seeders or plows. In addition to tractors, other types of self-propelled working vehicles are also used in agriculture, such as self-propelled harvesting machines (e.g., combine harvesters or forage harvesters) or vehicles for moving loads (e.g., an earthmover or telescopic handler).

A variety of arrangements for automatic control of travel speed and steering movements of agricultural working machines on the field have been described. For controlling the speed, these arrangements can be based on measurements of crop properties or tensile force measurements while cultivating, and for steering, these arrangements can be based on optical detection of a swath to be picked up or a travel lane or a map of the field in conjunction with a position determination by means of a satellite-based position detection systems. In certain prior art, however, specifying the speed and steering a working machine when driving on a road has been done manually by the driver of the working machine. This driving can be relatively fatiguing on extended working days and is difficult and dangerous with heavily loaded trailers or with large and heavy implements, especially for relatively inexperienced personnel.

A number of arrangements for automatic distance control are known from the automotive field, using sensors for recognizing the distance and speed of a preceding vehicle (German Patent Application No. DE 10 2013 013 243 A1) and/or communication of vehicles with one another (German Patent Application No. DE 40 35 501 A1). The loading of the vehicle, particularly a truck with or without a trailer or a passenger automobile with a trailer or a luggage carrier, which have an influence on the driving dynamics of the vehicle, is important for controlling the speed of the vehicle, and therefore it has already been proposed to have the data regarding the load input by the driver or automatically detected by sensors (German Patent Publications DE 10 2013 013 243 A1, DE 20 2011 100 493 U1, DE 20 2011 100 844 U1, and DE 10 2011 012 407 A1). The arrangement for specifying the travel speed of the vehicle thus obtains data regarding the trailer itself, such as the empty weight thereof, as well as data detected by sensors or manually input, and considers these for controlling the speed.

German Patent Application DE 10 2007 032 310 A1 describes a self-propelled working vehicle in which a monitoring device applies a variable force via an actuator to the speed input means (accelerator pedal) controlled by the driver, with the intention of inducing the driver to drive at an appropriate speed with regard to economy or safety aspects. Accordingly, if the driver attempts to drive faster than is appropriate, the accelerator pedal can only be moved downward against a relatively high resistance. For this purpose, the force acting on the working machine from a trailer or implement, or the yawing moment of a working machine when cornering, are detected by a sensor and compared to a threshold value.

Finally, it has been proposed to identify attached implements, based on identification plaques attached thereto on which machine-readable information for identifying the implement is present, by means of a camera and image processing software in order to be able to facilitate maintenance and repair work or to be able to make adjustments to the working machine (German Patent Application DE 10 2013 109 444 A1); physical properties of the working machine such as the position of the center of gravity, as well as operating parameters of the identified attached implement such as the PTO speed, are determined for this purpose (German Patent Application DE 10 2012 109 210 A1), and additional information can be downloaded based on a reference to an Internet address that is included in the identification plaque. Such information can also be provided in a storage element that is physically connected to the attached implement (German Patent Application DE 102 30 474 A1).

SUMMARY

In accordance with one embodiment, an arrangement for monitoring and or controlling a driving state of a self-propelled agricultural working machine comprises a variable-position interface for attaching an implement. The variable-position interface has a control device to which vehicle-specific machine data, interface position data, and implement data can be supplied, where the machine data comprises vehicle-specific data regarding physical properties of the working machine and movement state-specific data regarding the movement of the working machine relative to an environment, where the interface position data comprises a position signal regarding the position of the interface, and where the implement data comprises implement data regarding physical properties of an implement mounted on the interface. The control device is operated to evaluate the driving state of the working machine, taking into consideration the supplied machine data, the interface position data and the implement data, where the control device is programmed to output steering signals or speed signals for control of the working machine based on the evaluated driving state.

DETAILED DESCRIPTION OF ILLUSTRATIVE EMBODIMENT(S)

Figure 1:
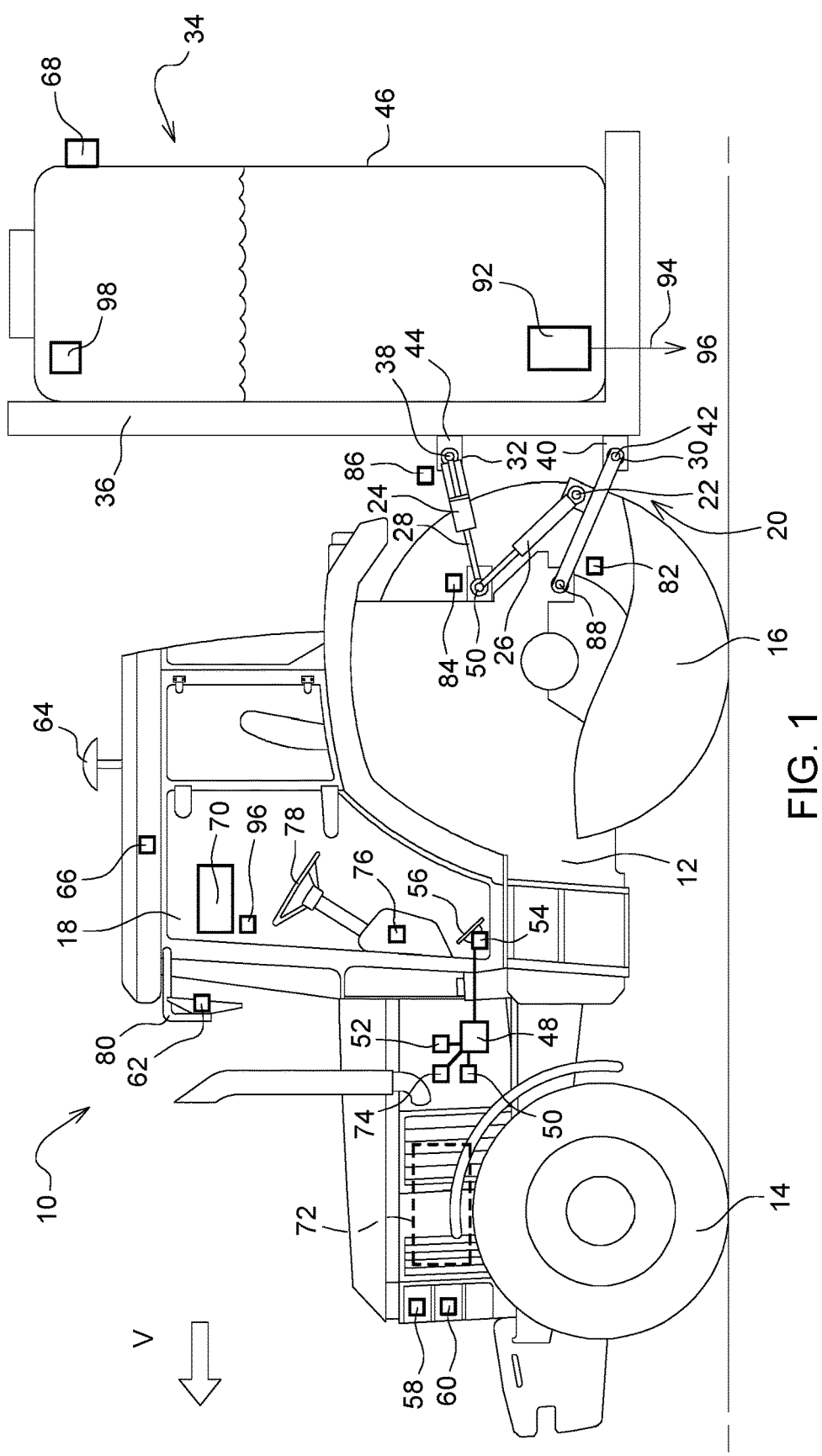
FIG. 1 shows a side view of a self-propelled agricultural working machine with a height adjustable interface and an implement attached thereto.

In accordance with one embodiment, an arrangement for monitoring and or controlling a driving state of a self-propelled agricultural working machine 10 comprises a variable-position interface 20 for attaching an implement 34. The variable-position interface 20 has a control device 48 to which vehicle-specific machine data, interface position data, and implement data can be supplied, where the machine data comprises vehicle-specific data regarding physical properties of the working machine 10 and movement state-specific data regarding the movement of the working machine 10 relative to an environment, where the interface position data comprises a position signal regarding the position of the interface 20, and where the implement data comprises implement data regarding physical properties of an implement 34 mounted on the interface 20. The control device 48 is operated to evaluate the driving state of the working machine 10, taking into consideration the supplied machine data, the interface position data and the implement data, where the control device 48 is programmed to output steering signals or speed signals for control of the working machine 10 based on the evaluated driving state.

In one embodiment, the distance controls known in the automotive field consider the loading of the vehicle and a trailer, if any, for automatic distance control in order to be able to take account of the varying braking distances and the varying driving behavior of the vehicle, in curves for example, based on the load. The position of the trailer relative to the ground and thus the position of the center of gravity thereof, which are required for detecting the driving state and for an optimal speed control in curves, can be assumed to be known since the wheels of the trailer are rolling on the ground. This applies analogously to roof luggage carriers on a passenger vehicle, the position of which is likewise fixedly predetermined and therefore known. The implements carried on self-propelled agricultural working machines are not necessarily attached to the trailer coupling, however, but rather to one of the above-mentioned height-adjustable interfaces in many cases. The current position of the interface also determines the position of the center of gravity of the combination of implement and working machine, which should be taken into account for a more precise detection of the driving state. In the cited prior art, however, consideration of the position of the attached implement or the interface is not provided for distance control.

In the prior art according to German Patent Application No. DE 10 2007 032 310 A1, only a sensor-based detection of the forces exerted by the implement on the working machine is used for achieving a reduction of the speed via the pedal in safety-critical states. Thus only the effect of the implement on the working machine is detected, which can be too late to avoid the danger in certain cases: if the yawing moment has already exceeded a threshold value when cornering, it may already be too late to bring the vehicle back into an uncritical state. The present invention therefore addresses the problem of creating an arrangement and a method for monitoring and/or controlling the driving state of a self-propelled working machine, in which the above-mentioned disadvantages of the prior art do not occur or occur only to a reduced extent.

An arrangement and a method are described for monitoring and/or controlling the driving state of a self-propelled agricultural working machine that comprises a variable-position interface for attaching an implement. The arrangement is equipped with a control device to which vehicle-specific data regarding physical properties of the working machine, movement state-specific data regarding the movement of the working machine relative to the environment, a position signal regarding the position of the interface, and implement data regarding physical properties of an implement mounted on an interface is supplied, and which can be operated to evaluate at least one information item regarding the driving state of the working machine, taking into consideration the vehicle-specific data, the movement state-specific, data, the position signal and the implement data. Environment signals regarding the environment of the working machine can optionally also be supplied to the control unit.

Thus, the arrangement can monitor and/or optionally control the driving state of the working machine, while it is driving on a public street and/or working on a field. In similar control devices for vehicles known from pure road vehicle engineering (automotive field), a control device automatically influences or controls the speed of the vehicle in a known manner, in particular the distance thereof from the preceding vehicle, and/or automatically decelerates the vehicle or automatically steers it along a road in the event of critical situations possibly leading to accidents, and thus takes account of vehicle-specific data regarding physical properties of the working machine and movement state-specific data regarding the movement of the working machine relative to the environment thereof and optionally environment signals with respect to the environment; in comparison to these systems, however, the present invention also takes into account a position signal regarding the variable position of the interface and implement data regarding physical properties of an implement attached to the working machine. This ensures that the control device can also consider the effects of the attached implement (in particular the mass and position of the center of gravity thereof) on the driving behavior of the working machine. Accordingly, if a heavy implement is transported in a relatively high position, the acceleration, deceleration and steering behavior of the working machine can be very disadvantageously influenced. In such cases, the control device will automatically ensure that larger distances from the preceding vehicle are maintained and that driving on curves is slower. This procedure is not based, or is at least not exclusively based, on sensor data regarding the driving behavior of the working machine, but rather on the above-mentioned position signal relating to the variable position of the interface and on the implement data regarding physical properties of an implement attached to the interface. Both types of information are thus available already when driving is started and are not first determined indirectly by sensors for detecting acceleration values and the like when a critical situation has occurred, which may already have gone out of control.

Based on the evaluated driving state, the control device can be programmed to output steering and/or speed signals for manual or automatic control of the working machine that are optimized for driving safety and/or fuel economy and/or driver comfort and/or the maintenance of a predetermined speed and/or of a predetermined distance from a preceding vehicle.

The environment signals can relate to one or more of the following features of the environment: the distance from a preceding vehicle, the speed of the preceding vehicle as measured (on board of the preceding vehicle or the working machine) or expected (i.e. estimated based on a recognized type of the vehicle); the distance from a vehicle that is following or traveling alongside (and possibly overtaking and cutting in front of) the working machine, as measured (on board the other vehicle or the working machine) or expected (i.e. based on a recognized type of the vehicle); the visibility; a measured or expected coefficient of friction of the ground under the vehicle; the width of a road lane being driven on; the inclination (uphill or downhill) of a road lane being driven on; the maximum speed applicable to a road being driven on; and the radius of a curve on a road lane being driven on. These environment signals can be determined by means of a suitable environment sensor or read out based on the position of the vehicle on a map or transmitted from other vehicles to the vehicle. Thus the position of the vehicle can be determined via GPS, compared to a map in order to calculate the radius of curvature of the next curve, and the speed can be reduced if necessary by means of this information.

The vehicle-specific data can relate to one or more of the following features of the working machine: dimensions, mass, geometry of the steering, mass distribution, position of the center of gravity, width of the tires, diameter of the tires, engine configuration, permissible maximum speed of the working machine with attached implement, properties of any existing suspension of the working machine and/or the implement, the ballasting of the working machine (i.e. the mass of the ballast weight and the installation location thereof) and properties of the working machine's brakes.

The movement state-specific data can relate to one or more of the following features of the working machine: current speed, current acceleration, and current steering angle. The position signal can relate to the vertical and/or lateral position of the interface and/or the location of the interface on the working machine, e.g. whether the implement is attached to a front or a rear interface. Settings and/or physical variables of the interface can also be considered. For a three point hitch, this would be for example: lifting spindle length, length of the upper link (particularly for hydraulically implemented upper links), mast height, attachment point of the link, lifting spindle bore.

The vehicle-specific data can relate to one or more of the following features of the working machine: mass, dimensions, mass distribution and position of the center of gravity in relation to the interface. This takes into account a payload of the implement, which can be situated in a tank for a spraying material or a container for seed or fertilizer.

The implement data can be stored in a storage element of the implement and transmitted by means of a bus to the control device, or input into the control unit by a user, or can be queried from a remote position based on an implement identifier or can be detectable by means of a sensor.

In particular, the working machine is a tractor that has a variable-position (three point) interface in the form of a front or a rear power lift for attaching any desired implement. The working machine can also be a self-propelled harvesting machine in the form of a combine harvester or a forage harvester that comprises a variable-position interface in the form of an inclined conveyor or an intake channel on which an implement in the form of a harvester head can be attached.

Working Machine and Implement

FIG. 1 shows a self-propelled agricultural working machine 10 in the form of an agricultural tractor. The working machine 10 is constructed on a frame 12 and is supported on the ground by front, steerable wheels 14 and drivable rear wheels 16. An operator work space is located in a cab 18.

A height-adjustable rear interface 20 in the form of a three point hitch, which is composed of two lower links 22 arranged one alongside the other and an upper link 24, is arranged at the rear end of the frame 12. The lower links 22 are adjustable in height by actuators 26 in the form of hydraulic cylinders. The upper link 24 is adjustable in length by an actuator 28 in the form of a hydraulic cylinder. By displacing the actuators 26, the rear ends of the lower links 22 can be brought into a position in which they can be coupled to any desired implement 34. Coupling points 30 in the form of upward-extending catch hooks (or any other coupling points, e. g. coupling eyelets as described in DIN ISO 730-1 Agricultural machines and tractors—Rear three-point hitch—Part 1: categories 1, 2, 3 and 4) are arranged in a conventional manner at the rear end of the lower link 22, while a likewise conventional upper link coupling point 32 is provided at the rear end of the upper link 24.

The implement 34 comprises a frame 36, which is mounted by means of lower brackets 40 and pins 42 on the lower link coupling points 30 of the lower links 22 and by an upper retaining element 44 and a pin 38 on the upper link coupling point 32. In the present example, the implement 34 is a field sprayer with a tank 46 for the spray fluid and a spraying rod, not shown, that is mounted on the frame 36.

Arrangement for Monitoring and/or Controlling the Driving State

The working machine 10 comprises an electronic control device 48 that is used for monitoring the driving state of the working machine 10, among other things. The control device 48 comprises one or more processors and a memory for programs and data. The control device 48 can be designed as a pure monitoring system and, in the event of unfavorable driving conditions in terms of safety and/or fuel consumption, can provide an indication to the driver to change the speed via a user interface 70 (or via the pedal 56), or it can intervene directly in the driving management of the working machine 10 by adjusting the speed and/or the steering angle.

The control device 48 is therefore connected to an engine controller 50, which controls the supply of fuel and/or air to, and therefore the engine speed and power of, an internal combustion engine 72 that powers, optionally via a transmission, a drivetrain equipped with the wheels 16 (and optionally 14), and optionally a power takeoff shaft, not shown. The control device 48 is also connected to a speed control device 52, which controls the propulsion speed of the working machine 10 by a corresponding actuation of the drivetrain composed of the wheels 16 and optionally 14 and the brakes associated with the wheels 14, 16. The control device 48 can also control a steering device 74 for controlling the steering angle of the wheels 14.

During driving operation on a road or on a field, the control device 48 receives signals relating to the position of an accelerator pedal 56 from a speed specification signal sensor 54 and, in normal operation, controls the propulsion speed of the working machine 10 based on the signals from the speed specification signal sensor 54 by actuating the engine controller 50 and the speed control device 52 such that the speed specified by the operator via the accelerator pedal 56 (or by manually operated speed input means) is maintained. The current speed can be detected for this purpose via conventionally known sensors for determining the rotational speed of the wheels 14, 16 and/or the speed of the working machine 10 over the ground (radar sensor and/or position determining device 64). Analogously, the control device 48 is connected to a steering angle specification sensor 76, which detects the position of a steering wheel 78 and controls the steering device 74 to maintain a desired steering angle specified by the operator, for which purpose conventionally known sensors determine the position of the wheels 14 about the vertical axis, which is used as a feedback value.

Detecting the Environment

The working machine 10 is provided with a number of sensors for detecting the environment. A front camera 58 views the area at the front side of the working machine 10, while a rear-view camera 62 is mounted on a rear-view mirror 80. A single camera or multiple mono or stereo cameras can be used, wherein the latter enable a three-dimensional detection of the environment. The cameras 58, 62 are each connected to image processing systems. A radar, ultrasound or laser scanning sensor 60 views the area at the front side of the working machine 10. An additional radar or ultrasound or laser scanning sensor 68 is mounted on the implement and views the rear. The image processing systems of cameras 58, 62 and the radar or ultrasound or laser scanning sensors 62, 68 are connected to the control device 48, which is additionally connected to a transmitting and receiving device 66 for communication with vehicles driving in the environment of the working machine 10 and to the position determination device 64 for receiving signals from satellites of a positioning system (e.g. GPS).

Detecting the Position of the Interface

A first position sensor 82 detects the position of the lower link 22, i.e. the angle of rotation about the front, horizontal axis of rotation 88 thereof, which is arranged transversely to the forward direction V of the working machine 10. A second position sensor 84 detects the position of the upper link 28, i.e. the angle of rotation about the forward axis of rotation 90 thereof, which is arranged horizontally and transverse to the forward direction V of the working machine 10. A third position sensor 86 determines the position of the piston of the cylinder 24 that defines the length of the top link 28. Based on the signals of these position sensors 82, 84, 86, the controller 48 calculates the position and orientation of a reference point of the interface, e.g. on the upper retaining element 44.

Detecting Physical Properties of the Implement

The control device 48 also requires implement data regarding physical properties of the implement 34 attached to the interface 20. In this regard, the reader is referred to the flow chart of FIG. 2. After startup, e.g. after starting the internal combustion engine 72 in step 100, the control device 48 queries whether an implement 34 is attached to the interface 20 in step 102. For this purpose, it is possible to evaluate the pressure in one of the cylinders 24, 26, which is higher if there is an attached implement 34 than in the absence of an implement 34, or to use a proximity switch (not shown) on one of the coupling points 30, 32, or to use the signal from camera 62. If no implement 34 is present, the process terminates in step 104. If the working machine 10 is equipped with multiple interfaces 20, e.g. an additional interface (not shown) at the front side of the working machine 10, step 102 is repeated for the additional interface.

If the result of step 102 is positive, step 106 follows, in which it is queried whether data on the implement 34 is available via a bus system 94. Such a bus system 94, designed in particular according to the ISO 11783 standard, connects an implement controller 92 to a virtual terminal 96 of the working machine 10, which terminal can be coupled to the user interface 70 or is independent thereof, so that it is possible to control the implement 34 via the user interface 70 by issuing user inputs provided via the user-interface 70, the virtual terminal 96 and the bus system 94 to the implement controller 92, which in turn activates actuators of the device 34. Sensor data from the implement 34 is transmitted analogously to the user-interface 70. The control device 48 is also connected to the bus system 94. The implement controller 92 comprises a memory in which data for implement 34 is stored, which can also comprise physical data for the implement 34 such as dimensions, empty weight, position of the center of gravity, or otherwise. A sensor 98 can be connected to the implement controller 92 and communicate the filter level of the tank 46 thereto.

If the above-mentioned data is available via the bus system 94, step 106 is followed by step 108, in which the control device 48 queries and receives the above-mentioned data regarding the dimensions, the empty weight, the position of the center of gravity and the fill level of the tank 46 from the implement controller 92. Step 114, in which the process terminates, follows.

If it is determined in step 106 that no data, or not all required data, has been received via the bus system 94, step 110 follows, in which it is queried whether the implement 34 is visually identifiable. For this purpose, a photograph of the implement 34 or of an identification means such as a barcode or a nameplate thereon is taken by camera 62 (or a different camera by the operator) and is compared to a database located in the control device 48 or remotely from the working machine 10, i.e. the photo is electronically transmitted via the transmitting and receiving device 66 to a remote point, where there is a comparison with the database. If the comparison is successful, the step follows in which the data regarding the dimensions, the empty weight and the position of the center of gravity of implement 34 is transmitted from the database back to the control device 48. Then step 114 also follows. Alternatively or additionally, it could be queried in step 110 whether the implement 34 is identifiable on the basis of a storage means (e.g. RFID) identifying the implement, and the data could be determined in the manner described in this paragraph.

If the result in step 110 is negative, step 116 follows, in which it is queried whether information is present in a database (stored in the control device 48 or externally) regarding a task to be carried out (e.g. fertilize field 123 with substance 3435 this morning) from which information regarding the implement could be derived. If that is the case, step 112 follows, in which the data regarding the dimensions, the empty weight and the position of the center of gravity of implement 34 is extracted from the external or internal database based on the task and the associated implement and fed to the control device 48. The fill level of tank 46 can optionally be determined based on the order. Then step 114 also follows.

If the result of step 116 is negative, step 118 follows, in which the data is acquired by sensors. For this purpose, the signals of camera 62 can be used in relation to the dimensions of the implement 34, and sensors for determining the pressure in cylinders 24 and 26 and/or a measured braking or accelerating behavior of the working machine 10 with the attached implement 34 can be used in relation to the weight. A more precise position of the center of gravity can be determined by driving experiments and by sensor-captured effects of the implement 34 on the driving behavior of the working machine 10, for example, by driving through a curve at a defined speed and measuring the lateral inclination of the working machine 10. It would also be possible for the driver to input the above-mentioned data into the user interface 70, e.g. based on a data sheet for the implement 34. Step 114 also follows.

Controlling the Driving State

Figure 2:
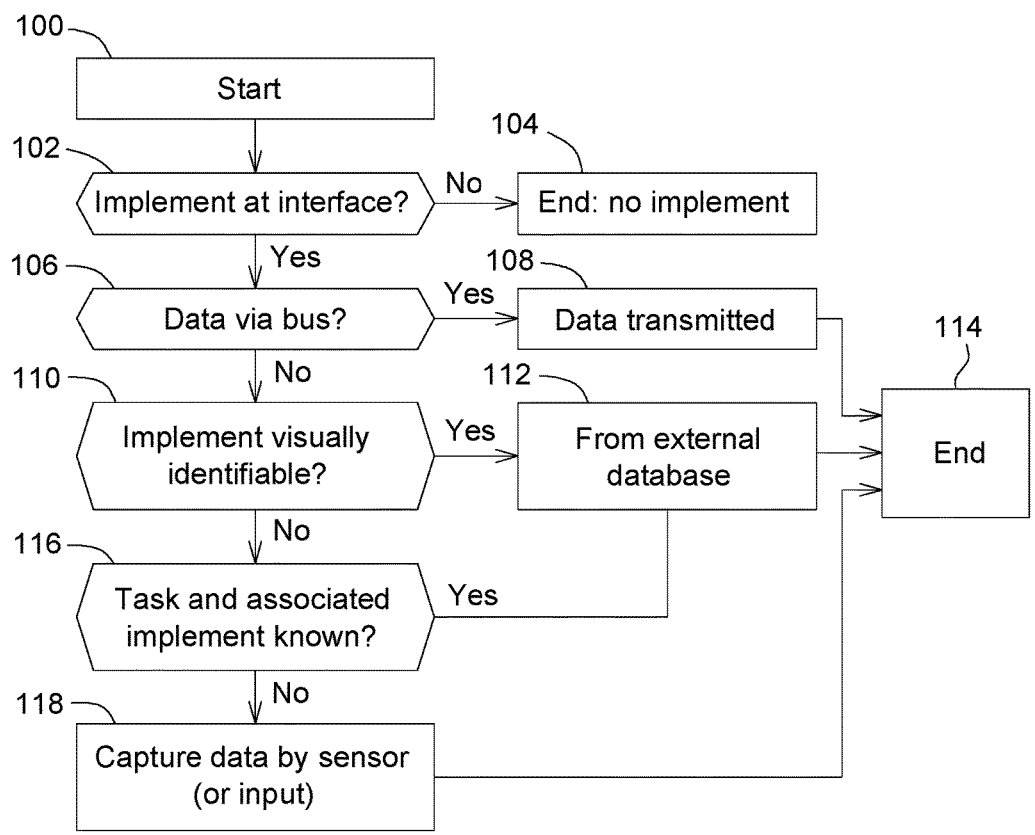
FIG. 2 shows a flow chart according to which the control device determines the required physical properties of the implement.

After passing through the method according to FIG. 2 and detecting the position of the interface 20, the control device 48 has sufficient information on the implement 34 to allow the control device 48 to calculate the effects of the implement 34 on the driving behavior of the working machine 10 and take them into account in monitoring the driving state of the working machine 10.

In monitoring the driving state of the working machine 10, the control device 48 uses the following:

(a) Environment signals of the environment sensors (cameras 58, 62 and radar or ultrasound or laser scanning sensors 60, 68) for detecting the environment of the machine. These environment sensors can detect properties of the road to be driven on such as curve radius, lane condition (wet or dry smooth or uneven), speed and distance of preceding vehicles in front, possible obstacles, traffic signs and so forth. Vehicles present in the vicinity can also transmit data regarding their position and speed to the control device 48, which obtains it via the transmitting and receiving device 66. Based on the position of the working machine 10 as evaluated by means of the position determining device 64 and of a map stored in a control a device 48, the further course of the street, which cannot be detected by means of the cameras 58, 62 and radar or ultrasound or laser scanning sensors 60, 68, can be determined. Furthermore, the permissible maximum speed can be determined based on the environment signals, for example based on traffic signs detected by the camera 58 and/or the position determining device 64 in conjunction with the map indicating the maximum speed and/or data entered into a database of the control device 48 or an external database regarding the driver's license of the respective operator or a maximum speed allowed for the driver by an owner of the working machine.

(b) Vehicle-specific data regarding physical properties of the working machine. This relates to physical data for the working machine such as weight of the working machine 10, position of the center of gravity, fill level of the hydraulic fluid and/or fuel tanks, position and mass of a ballast weight, engine power and torque curve for the internal combustion engine 72, data regarding the drivetrain, presence or absence of a front-wheel-drive, data regarding acceleration and/or braking and/or steering behavior. This data is fixedly prescribed for the respective working machine 10 or is detected by means of a suitable sensor or input into the control device 48 by the user via the user interface 70 and stored in the control device 48.

(c) Movement state-specific data regarding the movement of the working machine in relation to the environment, such as the speed and/or steering angle and/or yawing rate and/or acceleration(s). Appropriate conventionally known sensors of the working machine 10 are used for this. For example, by means of an (inertial) measuring unit: accelerations and rotational rates in all three directions can be measured.

(d) The described position signal regarding the position of the interface 20 relative to the working machine 10.

(e) And implement data regarding physical properties of the implement 34 attached to the interface, as described above in relation to FIG. 2.

The control device can 48, as described above, carry out a pure monitoring of the driving state of the working machine 10. In such an embodiment, the control device 48 evaluates on the basis of data items (a) through (e) whether a dangerous situation is foreseeable, and in such a case issues a warning signal to the operator of the machine 10 via the user interface 70 in order to motivate the operator to modify the type of driving, or it intervenes automatically in such a case, i.e. changes the speed and/or steering angle. Due to the consideration according to the invention of the position of the interface and the implement data, it can accordingly be determined if the center of gravity of the working machine 10 including the implement 34 is too high to be able to take a steering angle specified by the operator using the steering wheel 78, since otherwise there is a risk of rollover of the working machine, and the working machine 10 can be decelerated in that case.

In another embodiment, the control device 48 can control the speed and/or the steering angle during road driving, like known systems from the automotive field which, upon input by the user via the user interface 70 or some other operating element, hold the travel speed or the distance from the preceding vehicle constant and at a value specifiable or fixedly programmed by the operator, and in the case of automatic steering, automatically follow the course of the road. The control device 48 takes into account the above-mentioned parameters (a) to (e), and optionally a maximum travel speed input by the operator. The control device adapts the speed or distance regulation based on the mass, the position of the center of gravity and the attachment point of an implement 34 as well as the position of the interface at which the implement 34 is attached to the working machine 10. The control device 48 is primarily involved with avoiding dangerous situations and attaches second priority to attempts to maintain a constant travel speed or distance from the preceding vehicle. Thus, if a change of speed should become necessary within a foreseeable time, e.g. when approaching a very slow preceding vehicle or a very tight curve, the control device 48 will decelerate earlier and slower if there is a high center of gravity of the combination of working machine 10 and implement 34 than for a lower center of gravity, in order to guarantee driving stability and safety. It is possible to proceed analogously if the implement 34 is a trailer, baler or the like and is equipped with wheels and a towbar coupled to the trailer hitch of the working machine 10, wherein the consideration of the position of the interface is unnecessary if the interface in question (trailer hitch) is not height-adjustable in relation to the working machine 10.

Alternatively or additionally, the control device 48 can check whether the speed specified by an operator is favorable in terms of driver comfort and/or fuel consumption and can initiate a change if necessary. In this manner, it is possible to recognize whether an implement 34 should travel more slowly than currently provided, e.g. to reduce the fuel consumption or, in order to avoid the sloshing back and forth of the contents of an approximately half-filled tank 46 of the implement 34 shown in FIG. 1 and the associated uncomfortable rocking movements of the working machine 10.

The following is claimed:

1. An arrangement for monitoring and or controlling a driving state of a self-propelled agricultural working machine, the arrangement comprising:
a variable-position hitch interface for attaching an implement, the variable-position hitch interface having a control device to which machine data, hitch interface position data, and implement data can be supplied, where the machine data comprises vehicle-specific data regarding physical properties of the working machine and movement state-specific data regarding the movement of the working machine relative to an environment, where the hitch interface position data comprises a position signal regarding the position and orientation of a reference point of the hitch interface, and where the implement data comprises implement data regarding physical properties of an implement mounted on the hitch interface; and
the control device operated to evaluate the driving state of the working machine, taking into consideration the supplied machine data, the hitch interface position data and the implement data, where the control device is programmed to output steering signals or speed signals for control of the working machine based on the evaluated driving state.

2. The arrangement according to claim 1, wherein the control device can be supplied with environment signals regarding the environment of the working machine, and the control device can also be operated to evaluate the information regarding the driving state of the working machine on the basis of the environment signals.

3. The arrangement according to claim 2, wherein the environment signals relate to one or more of the following features of the environment: the distance from a preceding vehicle; the measured or expected speed of the preceding vehicle; the distance from a vehicle that is following or traveling alongside; the measured or expected speed of a vehicle that is following or traveling alongside; the visibility; a measured or expected coefficient of friction of the ground under the vehicle; the width of a road lane being driven on; the inclination of a road lane being driven on; the maximum speed applicable to a road lane being driven on; and the radius of a curve on a road lane being driven on.

4. The arrangement according to claim 1, wherein the control device can be programmed to output steering and speed signals for manual or automatic control of the working machine based on the evaluated driving state that are optimized for one or more of the following: driving safety, fuel economy, driver comfort, the maintenance of a predetermined speed, or a predetermined distance from a preceding vehicle.

5. The arrangement according to claim 1, wherein the vehicle specific data relates to one or more of the following features of the working machine: dimensions, mass, geometry of the steering, mass distribution, position of the center of gravity, width of the tires, diameter of the tires, engine configuration, permissible maximum speed of the working machine with attached implement, properties of any existing suspension of the working machine and/or the implement, the ballasting of the working machine and properties of the working machine's brakes.

6. The arrangement according to claim 1, wherein the movement state-specific data relates to one or more of the following features of the working machine: current speed, current acceleration, current steering angle.

7. The arrangement according to claim 1, wherein the position signal relates to the vertical or lateral position of the hitch interface, the position of the hitch interface on the working machine, and a physical property of the hitch interface.

8. The arrangement according to claim 1, wherein the equipment data relates to one or more of the following features of the implement: mass, dimensions, mass distribution and position of the center of gravity in relation to the hitch interface.

9. The arrangement according to claim 1, wherein the implement data can be stored in a storage element of the implement and transmitted by means of a bus system to the control device, or input into the control unit by a user, or can be queried from a remote position based on an implement identifier, or can be detected by means of a sensor.

10. The arrangement according to claim 1 further comprising:
a first sensor to detect a first position of a lower link of the hitch interface or a first angle of rotation of the lower link about a horizontal axis that is arranged transversely to a forward direction of travel of the working machine.

11. The arrangement according to claim 10 further comprising:
a second sensor to detect a second position of an upper link of the hitch interface or a second angle or rotation of the upper link about a forward axis of rotation that is arranged transversely to the forward direction of travel of the working machine.

12. The arrangement according to claim 11 further comprising:
a third sensor to detect a third position of the upper link that defines a length of the upper link, wherein the control device is configured to determine the position and the orientation of the reference point on a retaining element of the hitch interface based on signals representative of the detected first position, second position and third position.

13. The arrangement according to claim 1 further comprising:
the hitch interface having an upper link and a lower link;
an upper actuator associated with defining a length of the upper link; and
a lower actuator associated with the lower link for adjusting a coupling position of the lower link for coupling to the implement.

14. The arrangement according to claim 1 further comprising:
one or more environment sensors for detecting environment signals related to a distance from a vehicle that is following or traveling alongside the work machine and a measured or an expected speed of a vehicle that is following or traveling alongside the work machine.

15. The method according to claim 14 further comprising:
determining, by the control device, a position and an orientation of the reference point on a retaining element of the hitch interface based on signals representative of the detected first position, second position and third position.

16. A method for monitoring or controlling the driving state of a self-propelled agricultural working machine, comprising a variable-position hitch interface for attaching an implement, the method comprising:
supplying to a control device vehicle-specific data regarding physical properties of the working machine, movement state-specific data regarding the movement of the working machine relative to the environment, a position signal regarding the position and orientation of a reference point of the hitch interface, and implement data regarding physical properties of an implement mounted on the hitch interface; and evaluating, by the control device, the driving state of the working machine, taking into consideration the vehicle-specific data, the movement state-specific data, the position signal and the implement data; and output steering signals or speed signals for control of the working machine based on the evaluated driving state.

17. The method according to claim 16 further comprising:

detecting, by a first sensor, a first position of a lower link of the hitch interface or a first angle of rotation of the lower link about a horizontal axis that is arranged transversely to a forward direction of travel of the working machine;

detecting, by a second sensor, a second position of an upper link of the hitch interface or a second angle or rotation of the upper link about a forward axis of rotation that is arranged transversely to the forward direction of travel of the working machine; and detecting, by a third sensor, a third position of the upper link that defines a length of the upper link.

18. The method according to claim 16 further comprising:

detecting one or more environment signals related to a distance from a vehicle that is following or traveling alongside the work machine and a measured or an expected speed of a vehicle that is following or traveling alongside the work machine.

* * * * *